United States Patent
Fujioka et al.

(10) Patent No.: US 7,652,718 B2
(45) Date of Patent: Jan. 26, 2010

(54) CAMERA MODULE AND ELECTRONIC APPARATUS

(75) Inventors: Hirokazu Fujioka, Ibaraki (JP); Makoto Sanou, Chiba (JP); Koji Natsubori, Chiba (JP)

(73) Assignee: Sony Corporation, Tokyo (JP)

( * ) Notice: Subject to any disclaimer, the term of this patent is extended or adjusted under 35 U.S.C. 154(b) by 522 days.

(21) Appl. No.: 11/525,954

(22) Filed: Sep. 25, 2006

(65) Prior Publication Data
US 2007/0097251 A1    May 3, 2007

(30) Foreign Application Priority Data
Oct. 28, 2005    (JP) .............................. 2005-315315

(51) Int. Cl.
*H04N 5/225* (2006.01)
(52) U.S. Cl. ..................... 348/374; 348/376; 250/239
(58) Field of Classification Search ................ None
See application file for complete search history.

(56) References Cited

U.S. PATENT DOCUMENTS

| 6,359,652 | B1 * | 3/2002 | Takada | 348/374 |
| 7,133,691 | B2 * | 11/2006 | Kang | 455/556.1 |
| 7,388,616 | B2 * | 6/2008 | Yamazaki | 348/373 |
| 7,505,215 | B2 * | 3/2009 | Sanou et al. | 359/694 |
| 2004/0075620 | A1 * | 4/2004 | Tanaka et al. | 345/1.1 |
| 2004/0135920 | A1 | 7/2004 | Choo | |
| 2005/0219371 | A1 | 10/2005 | Iwama | |

FOREIGN PATENT DOCUMENTS

| JP | 2005-86341 | 3/2005 |
| JP | 2005-086341 | 3/2005 |

OTHER PUBLICATIONS

Yang, Kunmin, at el "Research Development of Heat Conducive Rubber", Rubber Industry, 2005, vol. 52-2nd, p. 118-123.
Chinese Office Action issued Apr. 11, 2008 for corresponding Chinese Application No. 10149843.3.
EPO Search Report Dated Feb. 7, 2007; 7 pages.

* cited by examiner

*Primary Examiner*—Ngoc-Yen T Vu
(74) *Attorney, Agent, or Firm*—Rader, Fishman & Grauer PLLC (57) ABSTRACT

The present invention provides a camera module that includes: a camera body including a lens-barrel, a substrate, an image pickup device, and a signal processing unit; and a shield case. The shield case has a substrate-covering plate part and a lock part. An insulating and elastic cushion material is disposed between the substrate and the substrate-covering plate part. The cushion material is disposed in a compressed state between the substrate and the substrate-covering plate part by the locking of the lock part to the camera body.

13 Claims, 13 Drawing Sheets

CAMERA MODULE AND ELECTRONIC APPARATUS

CROSS REFERENCES TO RELATED APPLICATIONS

The present invention contains subject matter related to Japanese Patent Application JP 2005-315315 filed in the Japanese Patent Office on Oct. 28, 2005, the entire contents of which are incorporated herein by reference.

BACKGROUND OF THE INVENTION

1. Field of the Invention

The present invention relates to a camera module and an electronic apparatus.

2. Description of the Related Art

In recent years there have been provided electronic apparatuses, such as cellular phones and PDAs (Personal Digital Assistants), in which a camera module is incorporated.

A camera module includes a lens-barrel holding a shooting optical system, a substrate attached to the rear end of the lens-barrel, an image pickup device incorporated in the lens-barrel and operative to pick up an image of an object guided by the shooting optical system and to output an image pickup signal, and a signal processing unit provided on the substrate and operative to receive the image pickup signal outputted from the image pickup device and to perform a predetermined signal processing, and a shield case is provided for covering the lens-barrel and the substrate and providing electromagnetic shielding for the image pickup device and the signal processing unit (refer to, for example, Japanese Patent Laid-open No. 2005-86341).

SUMMARY OF THE INVENTION

Meanwhile, the shield case of the camera module as above-mentioned is, in many cases, electrically connected to the substrate by soldering or the like and, simultaneously, rigidly fixed to the substrate.

Therefore, when a strong impact is exerted on the shield case due to dropping the shooting apparatus or the like, an irrational force is exerted on the portion between the substrate and the shield case; accordingly, there is a limitation to the enhancement of the impact resistance of the camera module.

Thus, there is a need to provide a camera module and an electronic apparatus which are advantageous in securing good impact resistance.

According to an embodiment of the present invention, a camera module includes a camera body and a shield case. The camera body includes a lens-barrel holding a shooting optical system, a substrate attached to the lens-barrel, an image pickup device incorporated in the lens-barrel and operative to pick up an image of an object focused by the shooting optical system and to output an image pickup signal, and a signal processing unit provided on the substrate and operative to receive the image pickup signal outputted from the image pickup device and to perform a predetermined signal processing. The shield case covers the lens-barrel and the substrate and is operative to perform electromagnetic shielding for the image pickup device and the signal processing unit. The shield case has a substrate-covering plate part covering the substrate, and lock parts locked to the camera body and operative to inhibit the substrate-covering plate part from moving away from the substrate. An insulating and elastic cushion material is disposed between the substrate and the substrate-covering plate part. The cushion material is disposed in a compressed state between the substrate and the substrate-covering plate part by the locking of the lock parts to the camera body.

In addition, according to another embodiment of the present invention, a camera module includes a camera body and a shield case. The camera body includes a lens-barrel holding a shooting optical system, a substrate attached to the lens-barrel, an image pickup device incorporated in the lens-barrel and operative to pick up an image of an object focused by the shooting optical system and to output an image pickup signal, and a signal processing unit provided on the substrate and operative to receive the image pickup signal outputted from the image pickup device and to perform a predetermined signal processing. The shield case covers the lens-barrel and the substrate and is operative to provide electromagnetic shielding for the image pickup device and the signal processing unit. The lens-barrel has a front end and a rear end at both side positions along the optical axis of the shooting optical system. The substrate is attached to the rear end of the lens-barrel. The shield case includes a front split body covering a portion inclusive of the front end of the lens-barrel, and a rear split body covering a portion inclusive of the substrate. The rear split body has a substrate-covering plate part covering the substrate, and lock parts locked to the front split body and operative to inhibit the substrate-covering plate part from moving away from the substrate. An insulating and elastic cushion material is disposed between the substrate and the substrate-covering plate part. The cushion material is disposed in a compressed state between the substrate and the substrate-covering plate part by the locking of the lock parts to the front split body.

Besides, according to a further embodiment of the present invention, an electronic apparatus includes a casing, and a camera module incorporated in the casing. The camera module includes a camera body and a shield case. The camera body includes a lens-barrel holding a shooting optical system, a substrate attached to the lens-barrel, an image pickup device incorporated in the lens-barrel and operative to pick up an image of an object focused by the shooting optical system and to output an image pickup signal, and a signal processing unit provided on the substrate and operative to receive the image pickup signal outputted from the image pickup device and to perform a predetermined signal processing. The shield case is configured to cover the lens-barrel and the substrate and to provide electromagnetic shielding for the image pickup device and the signal processing unit. The shield case has a substrate-covering plate part covering the substrate, and lock parts locked to the camera body and operative to inhibit the substrate-covering plate part from moving away from the substrate. An insulating and elastic cushion material is disposed between the substrate and the substrate-covering plate part. The cushion material is disposed in a compressed state between the substrate and the substrate-covering plate part by the locking of the lock parts to the camera body. The substrate-covering plate part is attached to an inside wall of the casing, whereby the camera module is disposed in the inside of the casing.

Furthermore, according to yet another embodiment of the present invention, an electronic apparatus includes a casing, and a camera module incorporated in the casing. The camera module includes a camera body and a shield case. The camera body includes a lens-barrel holding a shooting optical system, a substrate attached to the lens-barrel, an image pickup device incorporated in the lens-barrel and operative to pick up an image of an object focused by the shooting optical system and to output an image pickup signal, and a signal processing unit provided on the substrate and operative to receive the image pickup signal outputted from the image pickup device and to perform a predetermined signal processing. The shield case is configured to cover the lens-barrel and the substrate and to provide electromagnetic shielding for the image pickup device and the signal processing unit. The lens-barrel has a front end and a rear end at both side positions along the optical axis of the shooting optical system. The substrate is attached to the rear end of the lens-barrel. The shield case includes a front split body covering a portion inclusive of the front end of the lens-barrel, and a rear split body covering a portion inclusive of the substrate. The rear split body has a substrate-covering plate part covering the substrate, and lock parts locked to the front split body and operative to inhibit the substrate-covering plate part from moving away from the substrate. An insulating and elastic cushion material is disposed between the substrate and the substrate-covering plate part. The cushion material is disposed in a compressed state between the substrate and the substrate-covering plate part by the locking of the lock parts to the front split body. The substrate-covering plate part is attached to an inside wall of the casing, whereby the camera module is disposed in the inside of the casing.

Thus, according to an embodiment of the present invention, a cushion material is interposed between a substrate-covering plate part and a substrate. Therefore, even if an impact is exerted on the camera module, the cushioning action of the cushion material prevents an irrational force from acting on the portion between the shield case and the substrate, which is advantageous in securing the shock resistance of the camera module.

In addition, since the cushion material is interposed in a compressed state between the substrate-covering plate part and the substrate, there is obtained an advantage in that the shield case can be mounted on the camera body without the possibility of chattering.

DETAILED DESCRIPTION OF THE PREFERRED EMBODIMENTS

First Embodiment

Now, a first embodiment of the present invention will be described below by referring to the drawings.

Figures 1A, 1B:
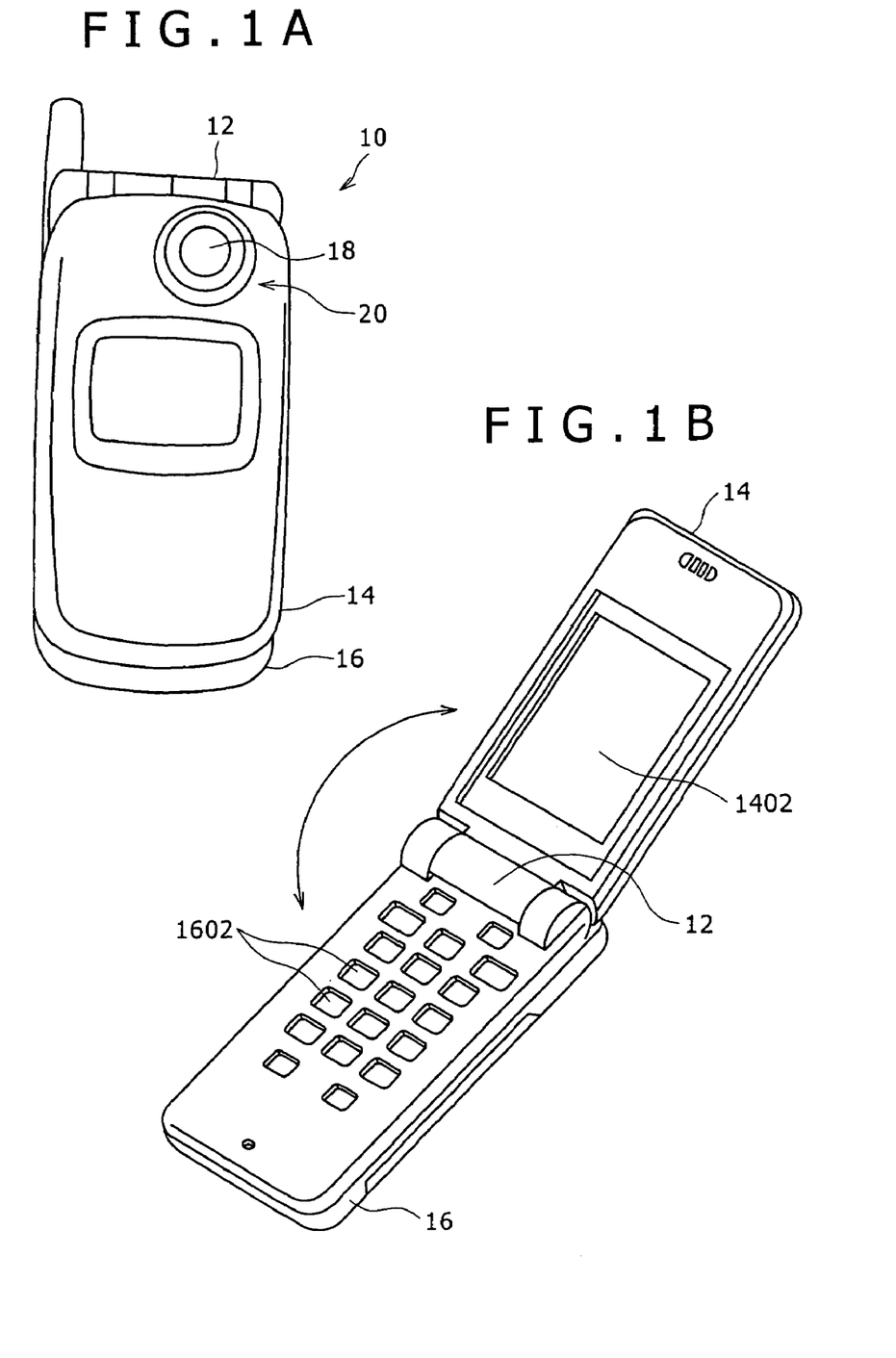
FIGS. 1A and 1B each show an appearance of an example of a cellular phone with a camera module incorporated therein.

FIGS. 1A and 1B each show an appearance of an example of a cellular phone 10 as an electronic apparatus with a camera module incorporated therein.

As shown in FIGS. 1A and 1B, the cellular phone 10 has first and second casings 14 and 16 which are swingably connected to each other through a hinge portion 12.

A liquid crystal display panel 1402 is provided at the inside surface of the first casing 14, and operating switches 1602, such as ten-keys and functional keys, are provided at the inside surface of the second casing 16.

A camera module 20 is incorporated in a base end portion of the first casing 14, and an image shot by the camera module 20 is displayed on the liquid crystal display panel 1402.

Figure 2A:
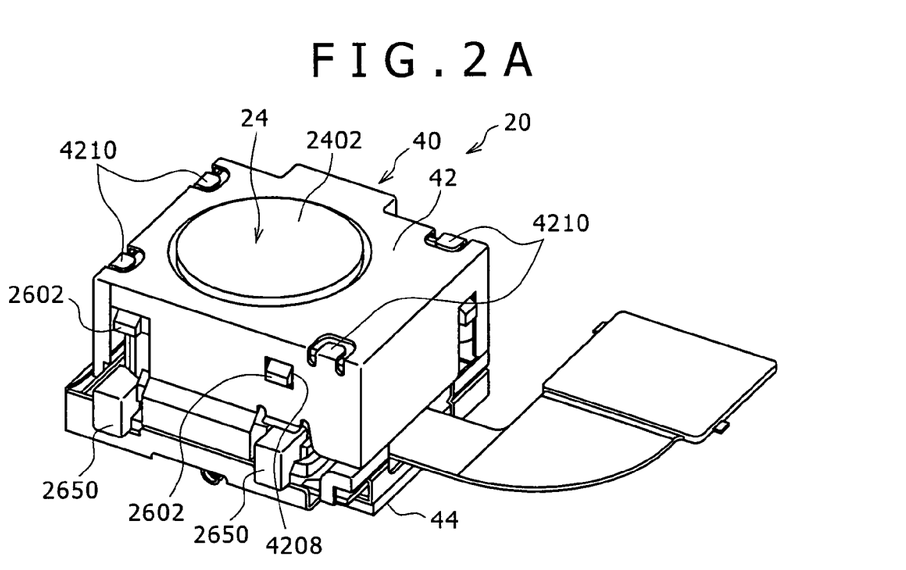
FIGS. 2A and 2B are perspective views of a camera module.
Figure 2B:
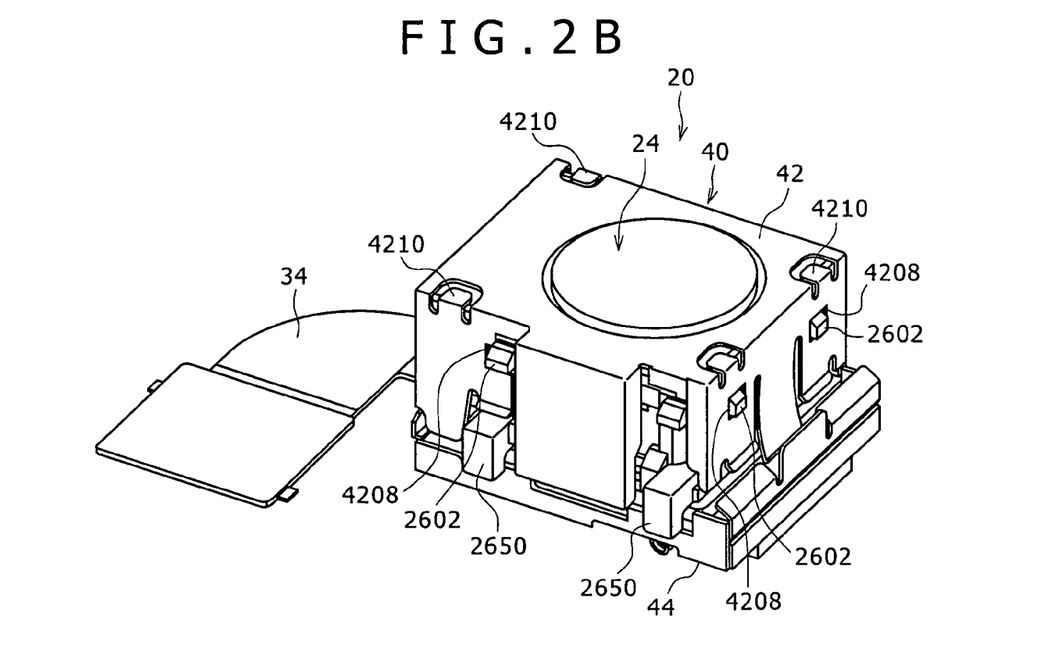
Figure 3:
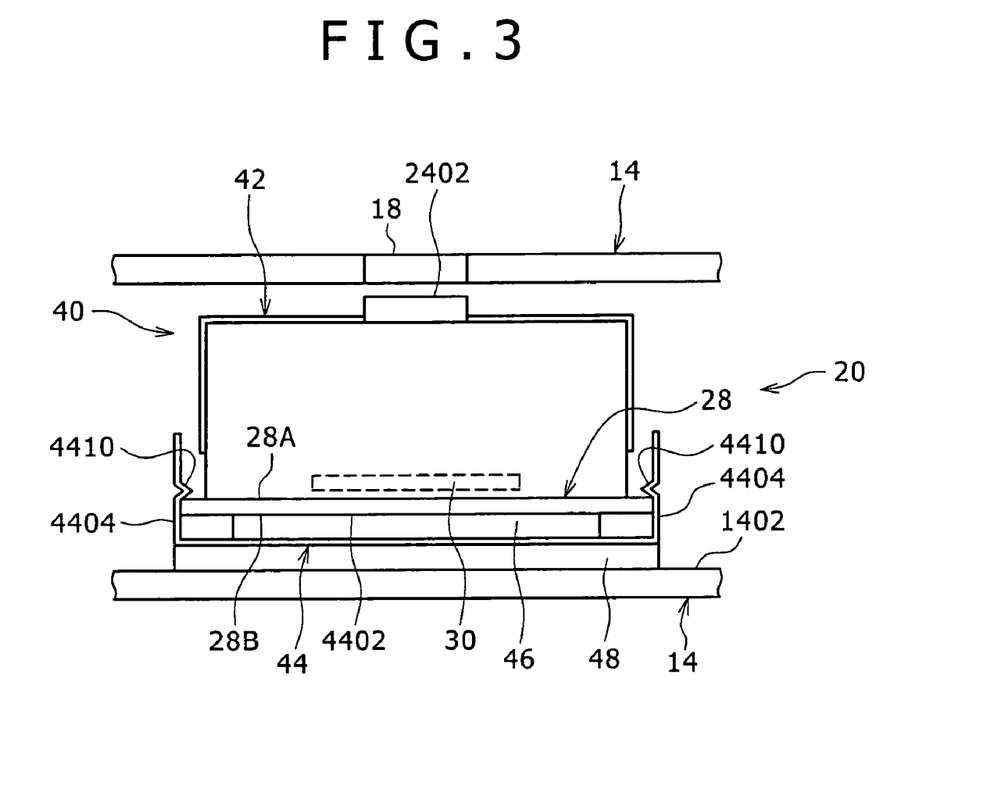
FIG. 3 is a sectional view of a camera module in the state of being incorporated in a first casing.
Figure 4A:
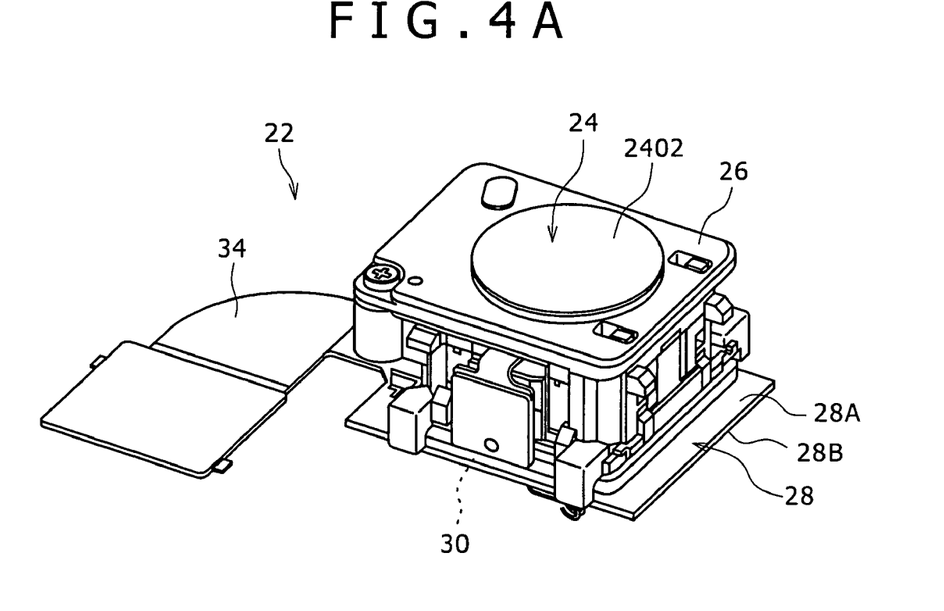
FIGS. 4A and 4B are perspective views of the camera module in the condition where a shield case has been removed.
Figure 4B:
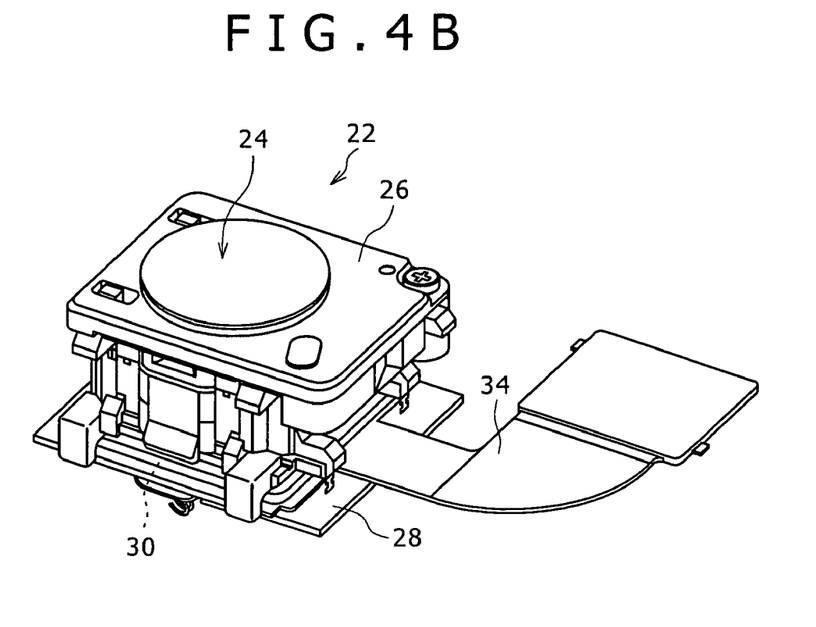

FIGS. 2A and 2B are perspective views of the camera module 20, FIG. 3 is a sectional view of the camera module 20 in the state of being incorporated in the first casing 14, and FIGS. 4A and 4B are perspective views of the camera module 20 from which a shield case 40 has been removed.

The camera module 20 includes a camera body 22 and the shield case 40.

Figure 5:
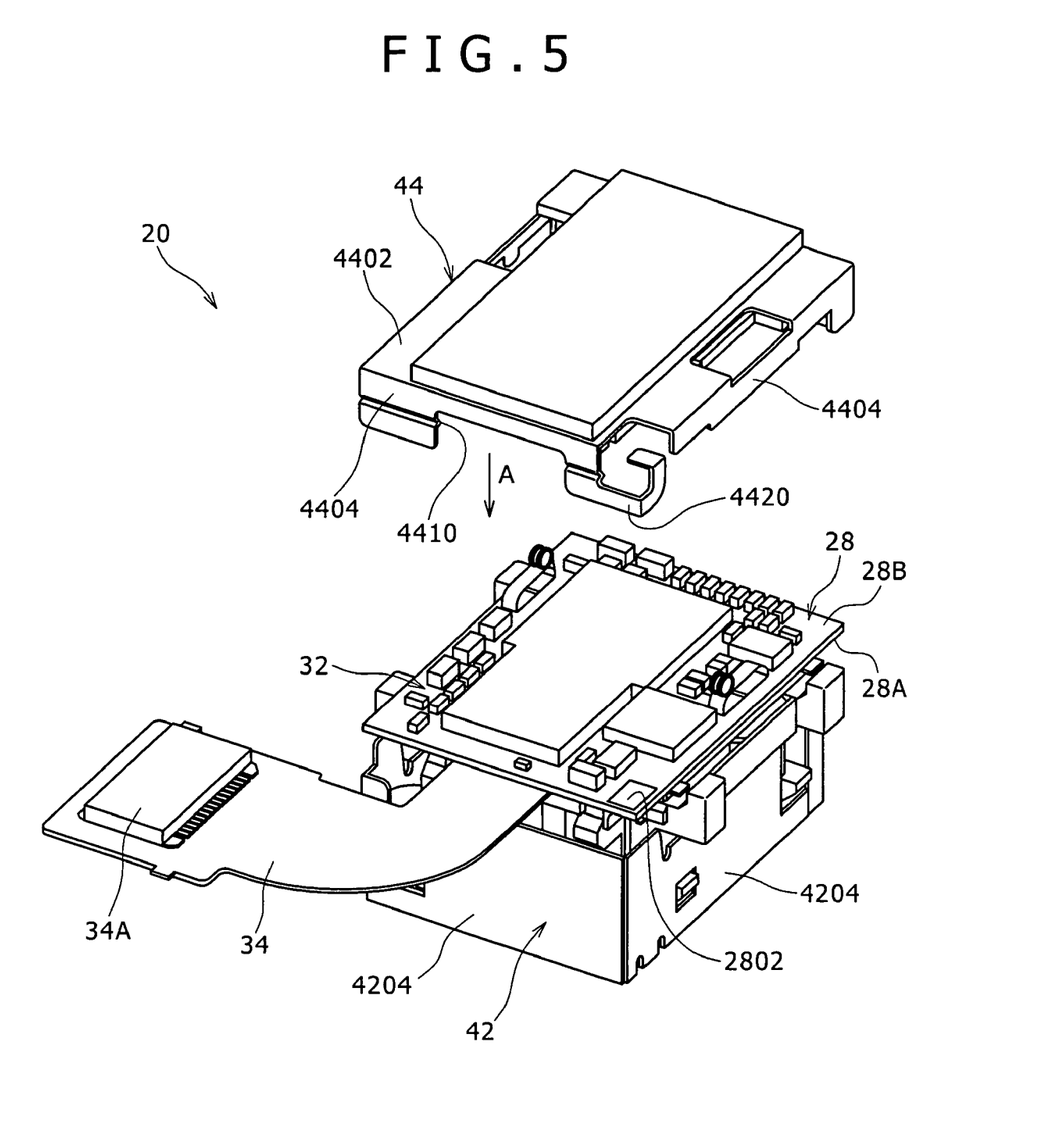
FIG. 5 is a perspective view of the camera module, with a rear split body detached therefrom.
Figure 6:
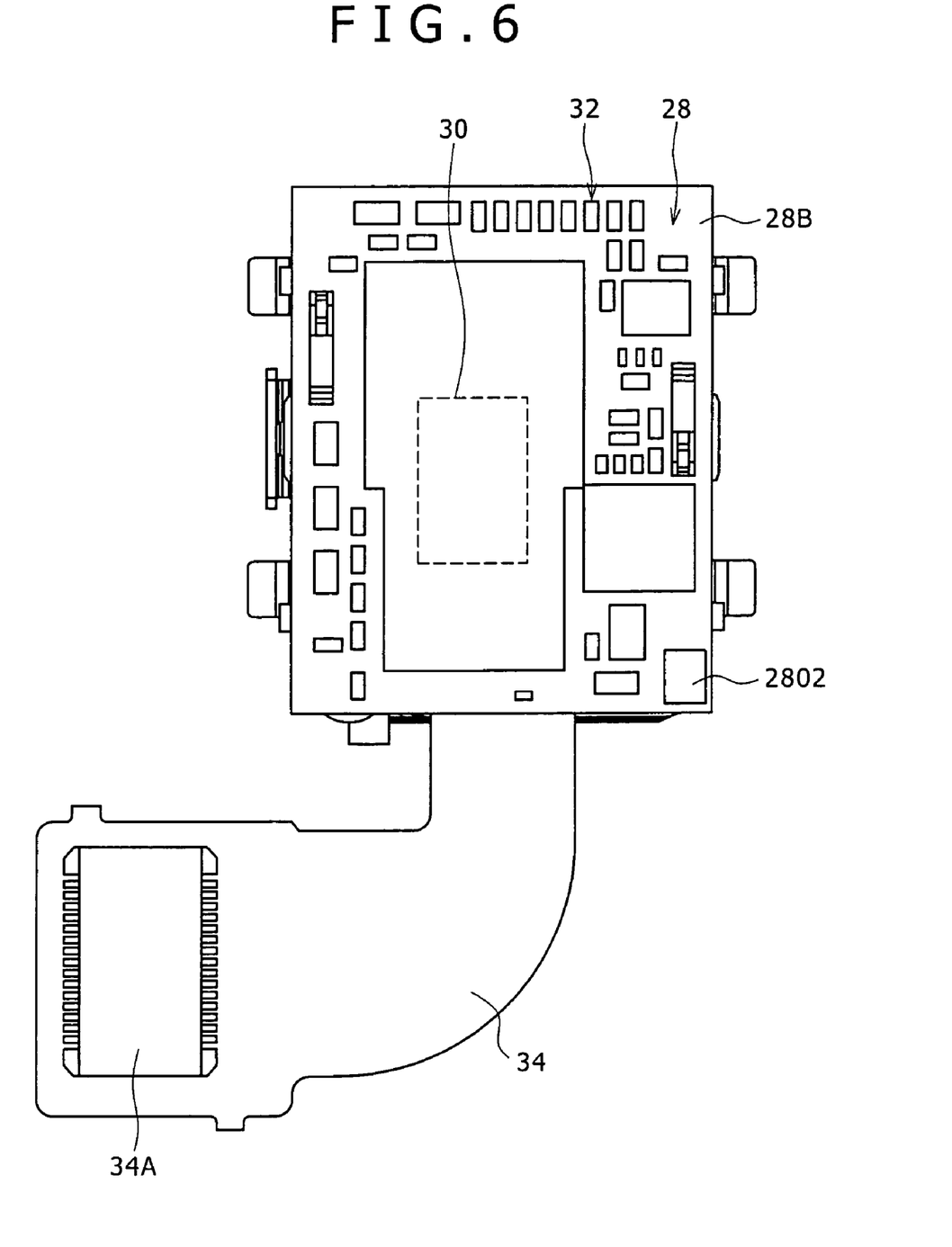
FIG. 6 is a view along arrow A of FIG. 5.

As shown in FIGS. 3, 4A and 4B, the camera body 22 includes a lens-barrel 26 holding a shooting optical system 24, a substrate 28 attached to the lens-barrel 26, an image pickup device 30 incorporated in the lens-barrel 26 and operative to pick up an image focused by the shooting optical system 24 and to output an image pickup signal, and a signal processing unit 32 provided on the substrate 28 and operative to receive the image pickup signal outputted from the image pickup device 30 and to perform a predetermined signal processing (see FIGS. 5 and 6).

The lens-barrel 26 has a front end and a rear end at both side positions along the optical axis of the shooting optical system 24, and an optical member 2402 (in this embodiment, a lens cover) constituting the shooting optical system 24 and located at a frontmost position is disposed in the state of being exposed at the front end of the lens-barrel 26.

The lens-barrel 26 is rectangular in shape, and is provided in its center with a containing space penetrating therethrough in the front-rear direction, in other words, extending along the optical axis of the shooting optical system 24.

FIG. 5 is a perspective view of the camera module 20, with a rear split body 44 detached therefrom, and FIG. 6 is a view along arrow A of FIG. 5.

As shown in FIGS. 4 to 6, the substrate 28 is attached to the rear end of the lens-barrel 26.

The substrate 28 is rectangular in shape and includes a front surface 28A fronting on the lens-barrel 26 and a rear surface 28B located on the opposite side.

The substrate 28 is formed with a profile greater than that of the rear surface constituting the rear end of the lens-barrel 26, and the four side portions of the substrate 28 protrude to the outside of the four sides of the rear surface of the lens-barrel 26.

A flexible substrate 34 is laid on the front surface 28A and attached to the front surface 28A by soldering, and an image pickup device 30 is mounted in a location where the flexible substrate 34 fronts on the lens-barrel 26.

Electronic component parts inclusive of various ICs and the like constituting the signal processing unit 32 are mounted on the rear surface 28B.

Besides, the rear surface 28B is provided with a ground land 2802 set at a reference potential.

Incidentally, in FIGS. 5 and 6, symbol 34A denotes a connector provided at the tip end of the flexible substrate 34.

Figure 7:
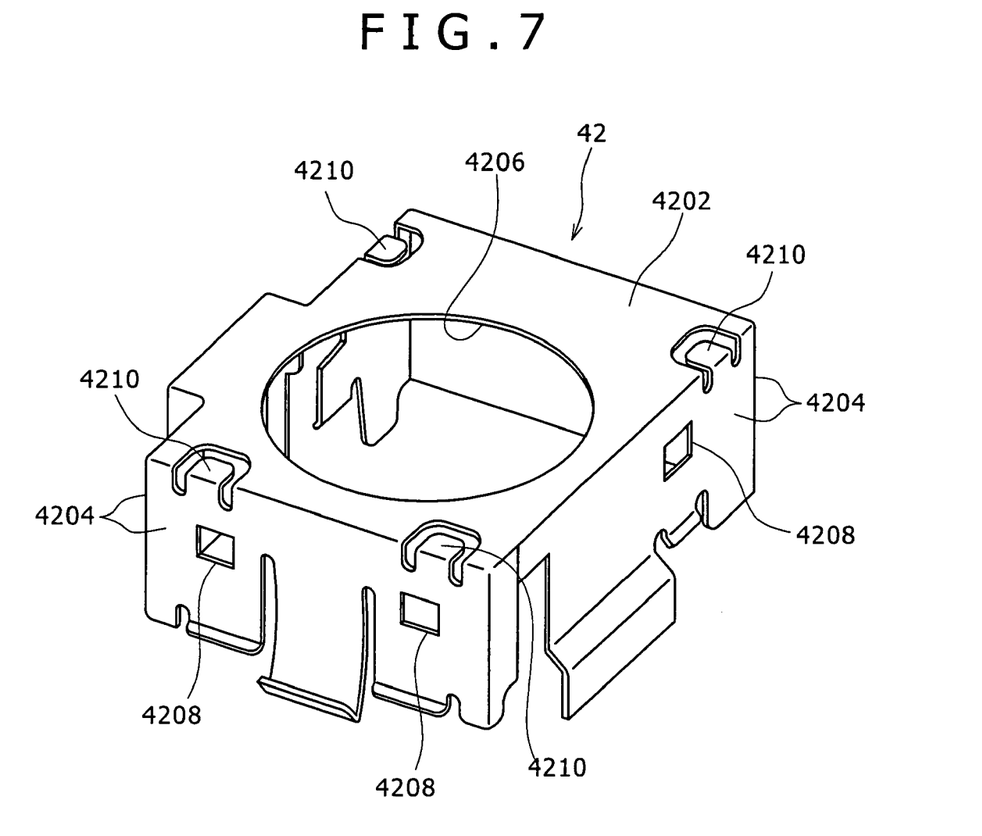
FIG. 7 is a perspective view of a front split body constituting the shield case.
Figure 8A:
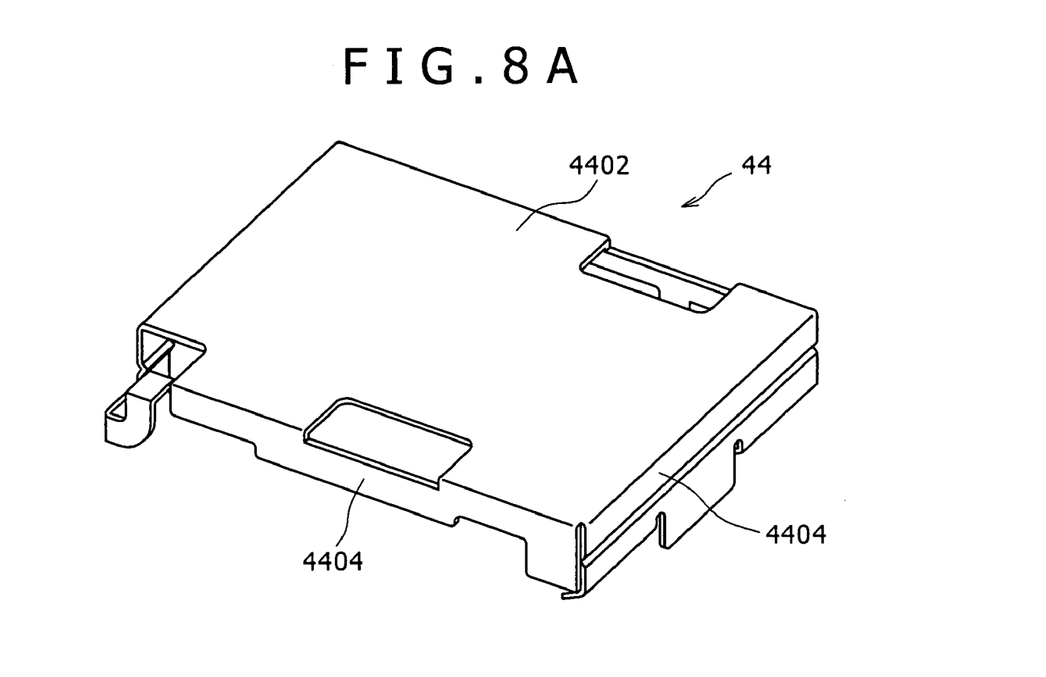
FIG. 8A is a perspective view of a rear split body constituting the shield case.
Figure 8B:
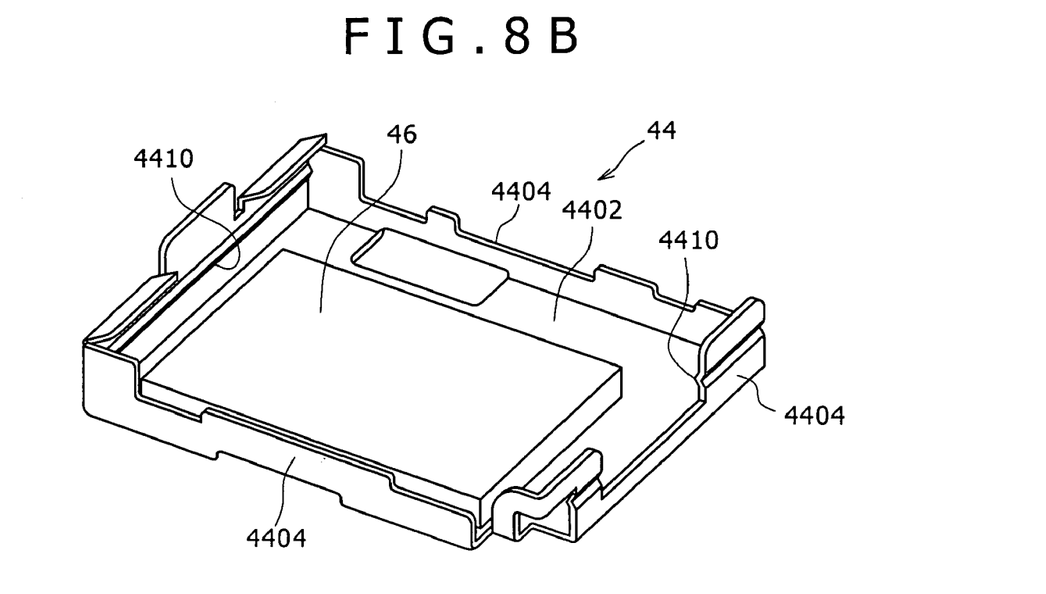
FIG. 8B is a perspective view from inside of the rear split body constituting the shield body.

FIG. 7 is a perspective view of a front split body 42 constituting the shield case 40; FIG. 8A is a perspective view of the rear split body 44 constituting the shield case 40; and FIG. 8B is a perspective view, from inside of the rear split body 44 constituting the shield case 40.

The shield case 40 is configured to cover the lens-barrel 26 and the substrate 28 and to provide electromagnetic shielding for the image pickup device 30 and said signal processing unit 32.

In this embodiment the shield case 40, is composed of the front split body 42 covering a front portion of the lens-barrel 26 and the rear split body 44 covering a rear portion of the lens-barrel 26.

The front split body 42 and the rear split body 44 are both formed of an electrically conductive and non-magnetic material, such as phosphor bronze, nickel silver, tinplate, and copper.

The front split body 42 has a rectangular front surface 4202 and four side surfaces 4204 bent from the four sides of the front surface 4202.

The front surface 4202 is provided with an opening 4206 for exposing the optical member 2402 therethrough.

As shown in FIGS. 2A, 2B, and 7, projections 2602 projected from the lens-barrel 26 are passed through openings 4208 formed in the side surfaces 4204 of the front split body 42, and four spring pieces 4210 provided at the front surface 4202 of the front split body 42 bias the projections 2602 onto the lower edges of the openings 4208, whereby the front split body 42 is mounted to a front portion of the lens-barrel 26.

As shown in FIGS. 8A and 8B, the rear split body 44 has a rectangular rear surface portion 4402, and side surface portions 4404 rising up from the four sides of the rear surface portion 4402 and extending along the side portions of the lens-barrel 26.

In this embodiment, the rear surface portion 4402 corresponds to a substrate-covering plate part covering the substrate 28; hereinafter, therefore, the rear surface portion 4402 will be described as the substrate-covering plate part 4402.

Of the two opposed pairs of side surface portions 4404, one opposed pair of side surface portions 4404 is provided with lock parts 4410 which are disengageably locked to the front surface 28A of the substrate 28 and the locking of which inhibits the substrate-covering plate part 4402 from moving in a direction of spacing away from the substrate 28.

Figure 9:
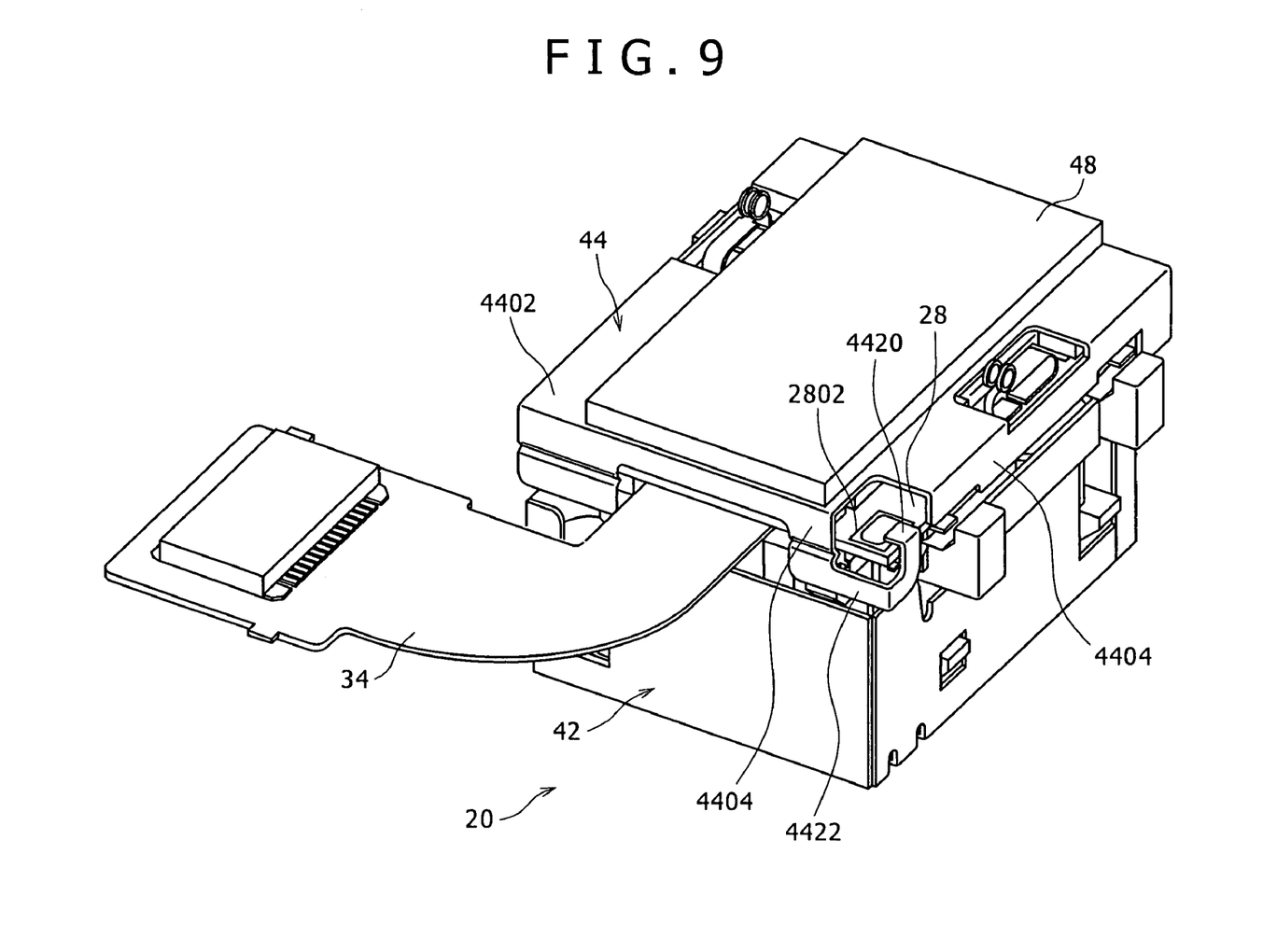
FIG. 9 is a perspective view from the rear side, of the camera module.
Figure 10:
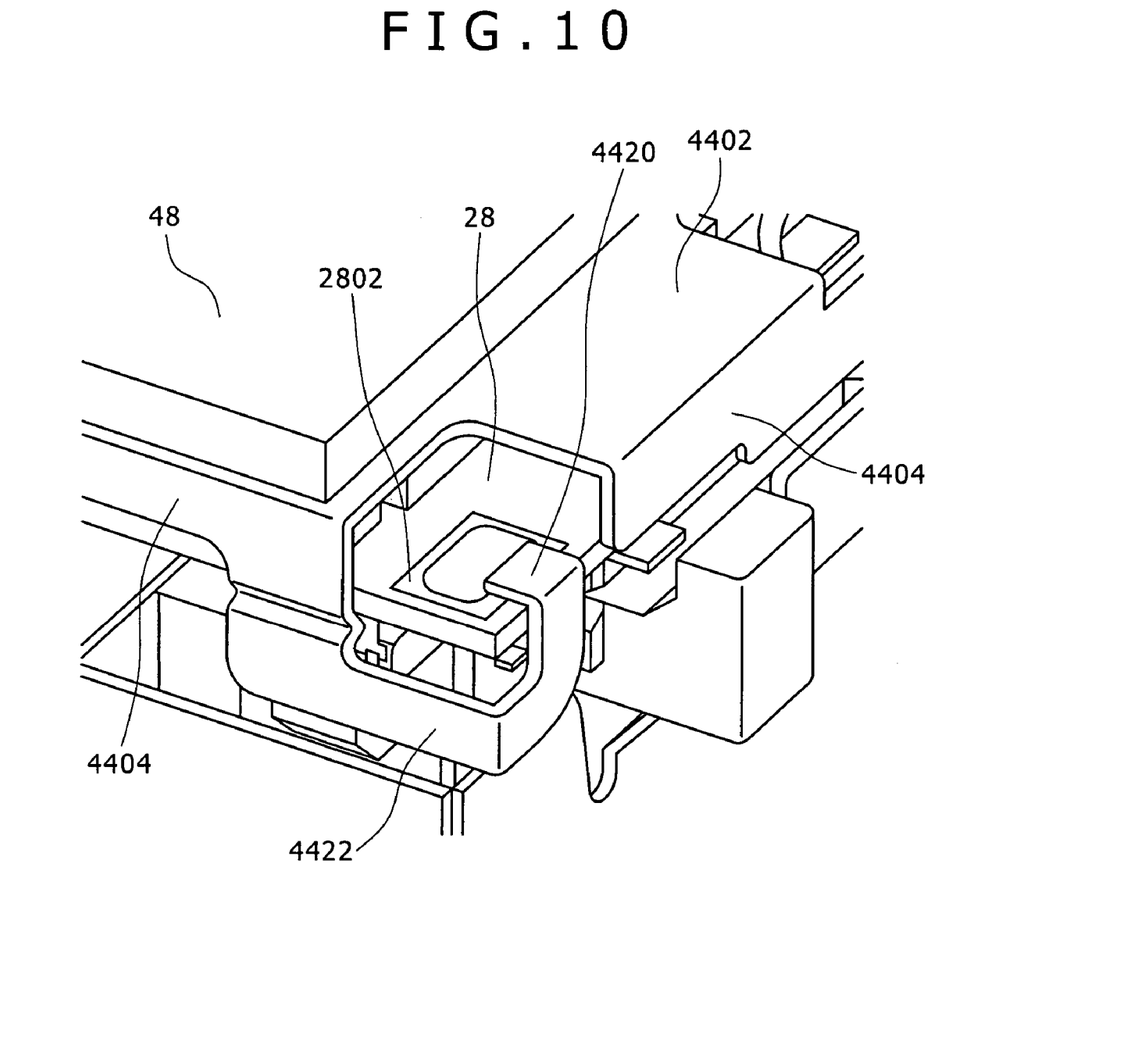
FIG. 10 is an enlarged perspective view of a part of FIG. 9.

FIG. 9 is a perspective view from the rear side of the camera module 20, and FIG. 10 is an enlarged perspective view of a part of FIG. 9.

A grounding contact piece 4420 for grounding the shield case 40 is provided at the side surface portion 4404.

The grounding contact piece 4420 is projected from the side surface portion 4404, extends in a direction intersecting with the direction of spacing away and approaching the substrate-covering plate part 4402 relative to the substrate 28, and has a tip portion joined to the ground land 2802 by soldering.

Specifically, the side surface portion 4404 is provided with an arm portion 4422 which projects from the side surface portion 4404, extends in a direction intersecting with the direction of spacing away and approaching the substrate-covering plate part 4402 relative to the substrate 28, and is elastically deformable in the direction of spacing away and approaching of the substrate-covering plate part 4402 relative to the substrate 28. The grounding contact piece 4420 is provided at the tip end of the arm portion 4422.

As shown in FIGS. 3 and 8B, an insulating and elastic cushion material 46 is disposed between the substrate 28 and the substrate-covering plate part 4402.

As the cushion material 46, there can be used an insulating and non-magnetic material, for example, foamed polyurethane or the like. Incidentally, foamed polyurethane is higher than air in thermal conductivity.

Besides, as shown in FIG. 3, with the lock parts 4410 locked to the camera body 22 (in this embodiment, the front surface 28A of the substrate 28), the cushion material 46 is disposed in a compressed state between the substrate 28 and the substrate-covering plate part 4402.

In other words, the lock parts 4410 are normally locked to the camera body 22 by the elastic force of the cushion material 46, whereby the rear split body 44 is mounted on the camera body 22 without the possibility of chattering.

In this embodiment, the cushion material 46 is composed of a plate-like member having a uniform thickness, so that the substrate 28 and the substrate-covering plate part 4402 are parallel to each other.

Incidentally, in the condition where the front split body 42 and the rear split body 44 are mounted on the camera body 22, a part of the tip end of the side surface portion 4204 of the front split body 42 and a part of the tip end of the side surface portion 4404 of the rear split body 44 make elastic contact with each other, whereby the front split body 42 and the rear split body 44 are electrically connected to each other.

Besides, in this embodiment, as shown in FIG. 3, in incorporating the camera module 20 into a base end portion of the first casing 14, a plate-like rubber vibration isolator 48 is interposed on the outside surface of the substrate-covering plate part 4402, and four leg parts 2650 (see FIG. 2) projected from the lens-barrel 26 are attached to an inside wall 1402 of the first casing 14, whereby the camera module 20 is disposed in position. To be more specific, the four leg parts 2650 projected from the lens-barrel 26 are engaged with engaging parts of the inside wall 1402 of the first casing 14, whereby the rubber vibration isolator 48 is mounted in a compressed state and is made to display a cushioning action so as to prevent the rear split body 44 from slipping out of position.

According to this embodiment, even if an impact is exerted on the camera module 20 due to dropping of the cellular phone 10 or the like, the presence of the cushion material 46 interposed between the substrate-covering plate part 4402 and the substrate 28, in addition to the cushioning action of the rubber vibration isolator 48, ensures that the cushioning action of the cushion material 46 prevents an irrational force from acting on the portion between the rear split body 44 and the substrate 28, which is advantageous in securing the impact resistance of the camera module 20.

In addition, since the cushion material 46 is disposed in a compressed state between the substrate 28 and the substrate-covering plate part 4402 and the lock part 4410 is normally locked to the camera body 22 by the elastic force of the cushion material 46, this configuration is advantageous in mounting the rear split body 44 on the camera body 22 without the possibility of chattering.

Besides, since the rear split body 44 is joined to the ground land 2802 of the substrate 28 through the arm part 4422 and the grounding contact piece 4420, an impact force will be damped by the flexure of the arm part 4422 when an impact is exerted on the camera module 20. Therefore, an irrational force would not act on the joint portion between the grounding contact piece 4420 and the ground land 2802, which is advantageous in securing the shock resistance of the joint portion between the grounding contact piece 4420 and the ground land 2802.

Further, where the cushion material 46 is composed of a material higher than air in thermal conductivity, such as foamed polyurethane, the heat generated in the substrate 28 will easily be transferred to the rear split body 44 through the cushion material 46, which is advantageous for the efficient cooling of the substrate 28.

Second Embodiment

Now, a second embodiment will be described below.

Figure 11:
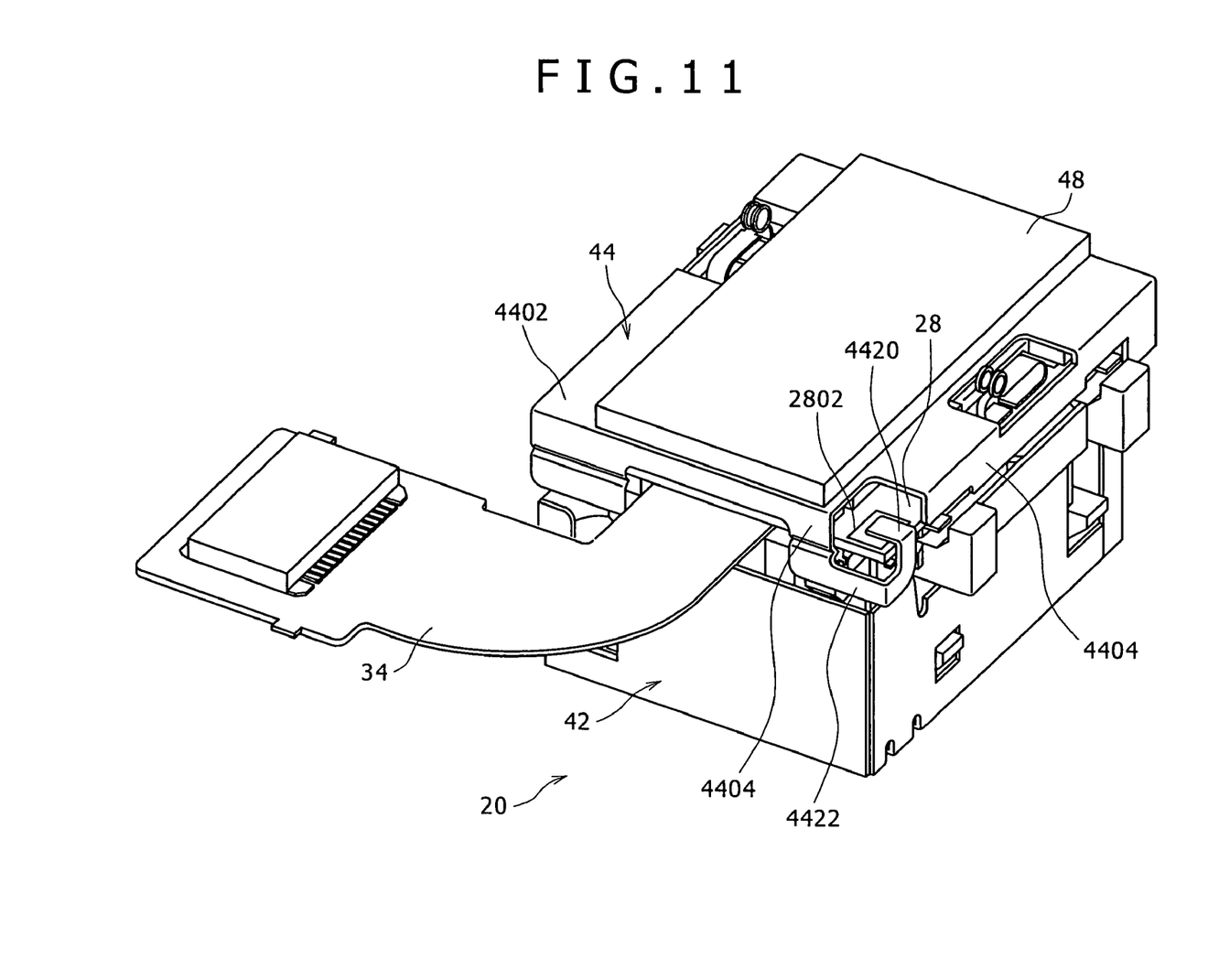
FIG. 11 is a perspective view from the rear side of a camera module according to a second embodiment.
Figure 12:
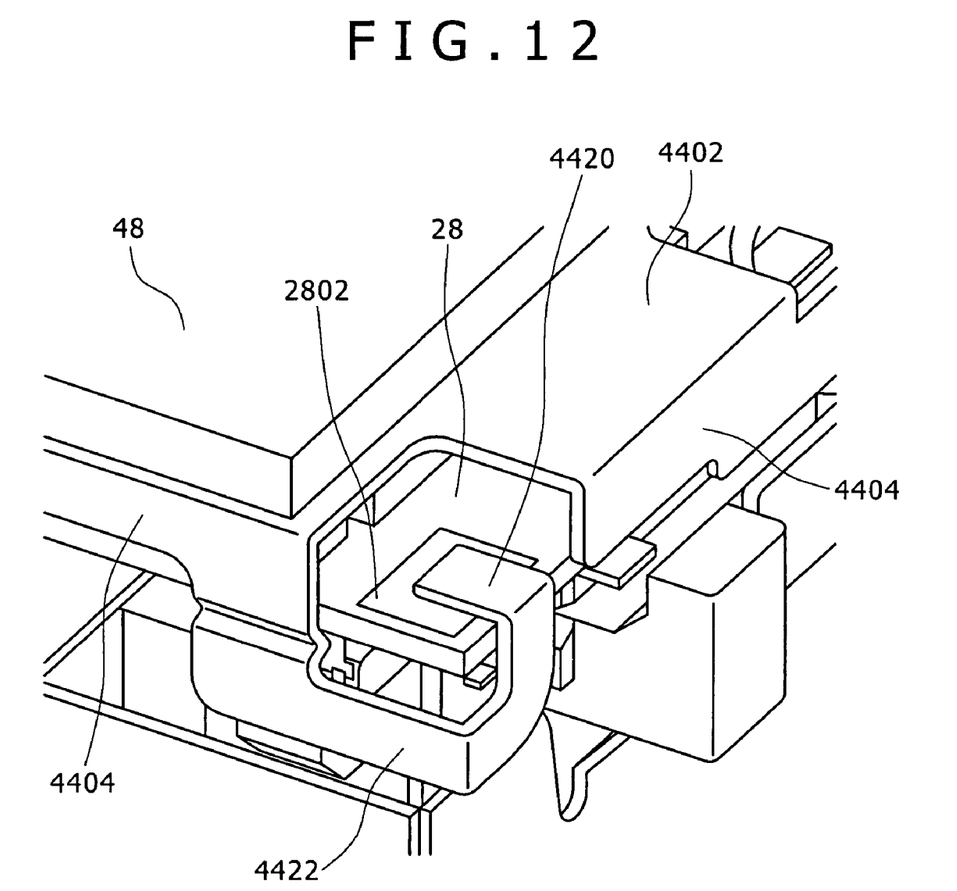
FIG. 12 is an enlarged perspective view of a part of FIG. 11.

FIG. 11 is a perspective view from the rear side of a camera module 20 according to the second embodiment, and FIG. 12 is an enlarged perspective view of a part of FIG. 11.

While the grounding contact piece 4420 and the ground land 2802 are joined to each other by soldering in the first embodiment above, in the second embodiment, a grounding contact piece 4420 and a ground land 2802 are normally kept in contact with each other by utilizing the elasticity of an arm part 4422; the other points of configuration in the second embodiment are the same as in the first embodiment.

In the second embodiment, there is provided the arm part 4422 which is projected from a side surface portion 4404, extends in a direction intersecting with the direction of spacing away and approaching a substrate-covering plate part 4402 relative to a substrate 28, and is elastically deformable in the direction of spacing away and approaching the substrate-covering plate part 4402 relative to the substrate 28.

The grounding contact piece 4420 capable of making contact with the ground land 2802 is provided at the tip end of the arm part 4422.

The grounding contact piece 4420 is put into contact with the ground land 2802 and the contact condition is maintained by the elasticity of the arm part 4422.

According to the second embodiment, the need for soldering work is eliminated, which is advantageous in contriving a simpler assembly, as compared with the case where the grounding contact piece 4420 and the ground land 2802 are soldered to each other.

In addition, since the grounding contact piece 4420 and the ground land 2802 are not fixed rigidly to each other, forces exerted on the joint portion between the grounding contact piece 4420 and the ground land 2802 can be moderated, which is advantageous in securing the impact resistance of the joint portion between the grounding contact piece 4420 and the ground land 2802.

Third Embodiment

Now, a third embodiment will be described below.

Figure 13:
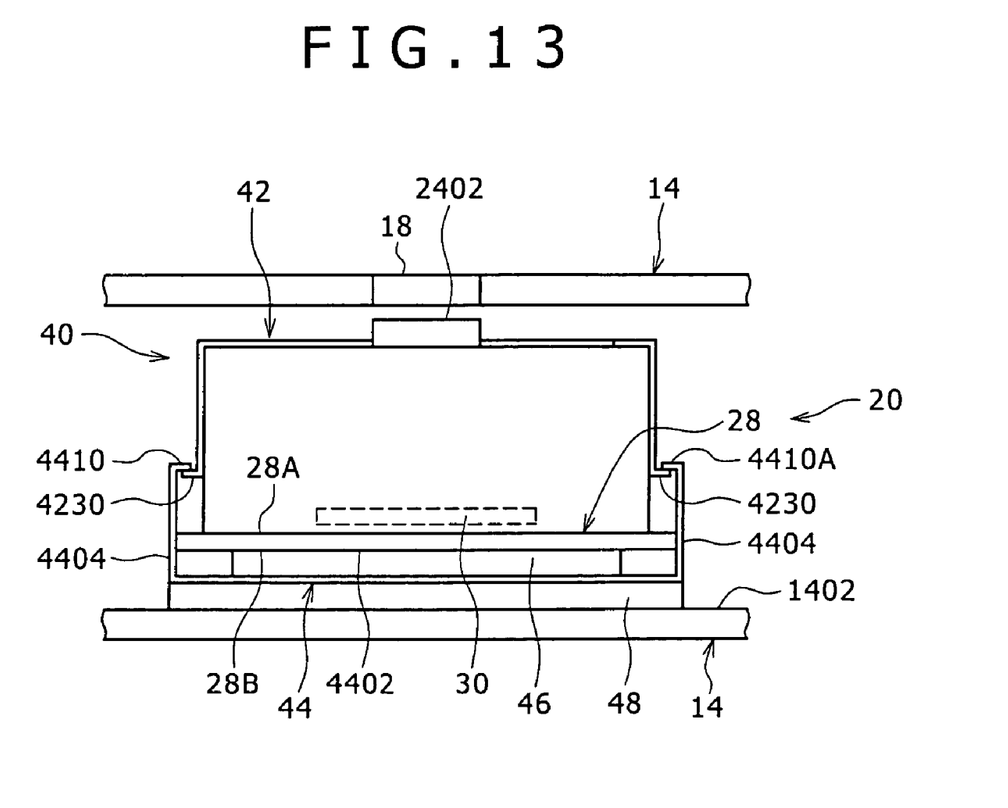
FIG. 13 is a sectional view of a camera module according to a third embodiment, in the state of being incorporated in a first casing.

FIG. 13 is a sectional view of a camera module 20 according to the third embodiment, in the state of being incorporated in a first casing 14.

While the lock parts 4410 for inhibiting the substrate-covering plate part 4402 from moving away from the substrate 28 are locked to the camera body 22 in the first embodiment above, in the third embodiment, lock parts 4410A are locked to a front split body 42; the other points of configuration in the third embodiment are the same as in the first embodiment.

Specifically, the lock parts 4410A are provided at the tip ends of one pair of side surface portions 4404 of two opposed pairs of side surface portions 4404 of a rear split body 44.

The lock parts 4410A can be locked to lock parts 4230 of the front split body 42, and the locking of the lock portions 4410A to the lock portions 4230 of the front split body 42 inhibits a substrate-covering plate part 4402 from moving away from a substrate 28.

In addition, a plate-like rubber vibration isolator 48 is interposed on the outside surface of the substrate-covering plate part 4402, and four leg parts 2650 (see FIG. 2) projected from a lens-barrel 26 are attached to the inside wall 1402 of the first casing 14, whereby the camera module 20 is disposed in position.

According to the just-described third embodiment, also, the same effects as in the first embodiment are displayed.

Incidentally, while the case where an elastic and insulating plate-like member is used as the cushion material 46 has been described in the above embodiments, a single coil spring or a plurality of coil springs formed from an elastic and insulating wire or the like can be used as the cushion material 46. However, the use of a plate-like member as in the above embodiments is advantageous in contriving a simpler structure and an easier assemblage.

Besides, while the case where the electronic apparatus is a cellular phone 10 has been described in the above embodiments, the present invention is widely applicable to, for example, portable information terminals, such as PDAs, notebook type personal computers, etc., and various shooting apparatuses, such as digital still cameras, video cameras, etc.

It should be understood by those skilled in the art that various modifications, combinations, sub-combinations, and alterations may occur depending on design requirements and other factors insofar as they are within the scope of the appended claims or the equivalents thereof.

What is claimed is:

1. A camera module comprising:

a camera body including a lens-barrel holding a shooting optical system, a substrate attached to said lens-barrel, an image pickup device incorporated in said lens-barrel and operative to pick up an image of an object focused by said shooting optical system and to output an image pickup signal, and a signal processing unit provided on said substrate and operative to receive said image pickup signal outputted from said image pickup device and to perform a predetermined signal processing; and a shield case covering said lens-barrel and said substrate and operative to provide electromagnetic shielding for said image pickup device and said signal processing unit;

wherein said shield case has a substrate-covering plate part covering said substrate, and a lock part locked to said camera body and operative to inhibit said substrate-covering plate part from moving away from said substrate;

an insulating and elastic cushion material is disposed between said substrate and said substrate-covering plate part; and said cushion material is disposed in a compressed state between said substrate and said substrate-covering plate part by the locking of said lock part to said camera body;

wherein said substrate is provided with a ground land set at a reference potential;

said substrate-covering plate part is rectangular in shape;

said shield case has two opposed pairs of side surface portions which rise from four sides of said substrate-covering plate part and extend along side portions of said lens-barrel;

said side surface portion is provided with an arm part which projects from said side surface portion, extends in a direction intersecting with the direction of spacing away and approaching said substrate-covering plate part relative to said substrate, and is elastically deformable in the direction of spacing away and approaching said substrate-covering plate part relative to said substrate;

a grounding contact piece capable of making contact with said ground land is provided at the tip end of said arm part; and said grounding contact piece is joined to said ground land.

2. The camera module as set forth in claim 1, wherein said lens-barrel has a front end and a rear end at both side positions along the optical axis of said shooting optical system, an optical member constituting said shooting optical system and located at a frontmost position is disposed in the state of being exposed at said front end of said lens-barrel, and said substrate is attached to said rear end of said lens-barrel.

3. The camera module as set forth in claim 1, wherein said cushion material is formed of a plate-like member having a uniform thickness, and said substrate and said substrate-covering plate part are parallel to each other.

4. The camera module as set forth in claim 1, wherein the position where said lock part is locked to said camera body lies in a surface where said substrate fronts on said lens-barrel.

5. The camera module as set forth in claim 1, wherein
said lock part is provided at one pair of side surface portions of said two opposed pairs of side surface portions.

6. The camera module as set forth in claim 1, wherein said cushion material is formed of a plate-like member including a material higher than air in thermal conductivity.

7. The camera module as set forth in claim 1:
wherein said lens-barrel has a front end and a rear end at both side positions along the optical axis of said shooting optical system, said substrate being attached to said rear end of said lens-barrel;

said shield case includes a front split body covering a portion inclusive of said front end of said lens-barrel, and a rear split body covering a portion inclusive of said substrate;

said rear split body has a substrate-covering plate part covering said substrate, and a lock part locked to said front split body and operative to inhibit said substrate-covering plate part from moving away from said substrate;
and said cushion material is disposed in a compressed state between said substrate and said substrate-covering plate part by the locking of said lock part to said front split body.

8. A camera module comprising:
a camera body including a lens-barrel holding a shooting optical system, a substrate attached to said lens-barrel, an image pickup device incorporated in said lens-barrel and operative to pick up an image of an object focused by said shooting optical system and to output an image pickup signal, and a signal processing unit provided on said substrate and operative to receive said image pickup signal outputted from said image pickup device and to perform a predetermined signal processing; and a shield case covering said lens-barrel and said substrate and operative to provide electromagnetic shielding for said image pickup device and said signal processing unit;

wherein said shield case has a substrate-covering plate part covering said substrate, and a lock part locked to said camera body and operative to inhibit said substrate-covering plate part from moving away from said substrate;

an insulating and elastic cushion material is disposed between said substrate and said substrate-covering plate part; and said cushion material is disposed in a compressed state between said substrate and said substrate-covering plate part by the locking of said lock part to said camera body;

wherein said substrate is provided with a ground land set at a reference potential; said substrate-covering plate part is rectangular in shape; said shield case has two opposed pairs of side surface portions which rise from four sides of said substrate-covering plate part and extend along side portions of said lens-barrel; said side surface portion is provided with an arm part which projects from said side surface portion, extends in a direction intersecting with the direction of spacing away and approaching said substrate-covering plate part relative to said substrate, and is elastically deformable in the direction of spacing away and approaching said substrate-covering plate part relative to said substrate; a grounding contact piece capable of making contact with said ground land is provided at the tip end of said arm part; and said grounding contact piece is put into contact with said ground land and the contact condition is maintained, by the elasticity of said arm part.

9. An electronic apparatus comprising a casing, and a camera module incorporated in said casing;
wherein said camera module includes a camera body and a shield case;

said camera body includes a lens-barrel holding a shooting optical system, a substrate attached to said lens-barrel, an image pickup device incorporated in said lens-barrel and operative to pick up an image of an object focused by said shooting optical system and to output an image pickup signal, and a signal processing unit provided on said substrate and operative to receive said image pickup signal outputted from said image pickup device and to perform a predetermined signal processing;

said shield case is configured to cover said lens-barrel and said substrate and to provide electromagnetic shielding for said image pickup device and said signal processing unit;

said shield case has a substrate-covering plate part covering said substrate, and a lock part locked to said camera body and operative to inhibit said substrate-covering plate part from moving away from said substrate;

an insulating and elastic cushion material is disposed between said substrate and said substrate-covering plate part;

said cushion material is disposed in a compressed state between said substrate and said substrate-covering plate part by the locking of said lock part to said camera body; and said substrate-covering plate part is attached to an inside wall of said casing, whereby said camera module is disposed in the inside of said casing;

wherein said substrate is provided with a ground land set at a reference potential;

said substrate-covering plate part is rectangular in shape;
said shield case has two opposed pairs of side surface portions which rise from four sides of said substrate-covering plate part and extend along side portions of said lens-barrel;

said side surface portion is provided with an arm part which projects from said side surface portion, extends in a direction intersecting with the direction of spacing away and approaching said substrate-covering plate part relative to said substrate, and is elastically deformable in the direction of spacing away and approaching said substrate-covering plate part relative to said substrate,
a grounding contact piece capable of making contact with said ground land is provided at the tip end of said arm part; and
said grounding contact piece is joined to said ground land.

10. The electronic apparatus as set forth in claim 9, wherein said substrate-covering plate part is attached to said inside wall of said casing in the condition where a rubber vibration isolator is interposed between said substrate-covering plate part and said inside wall of said casing.

11. The electronic apparatus as set forth in claim 9:
said lens-barrel has a front end and a rear end at both side positions along the optical axis of said shooting optical system, said substrate being attached to said rear end of said lens-barrel;
said shield case includes a front split body covering a portion inclusive of said front end of said lens-barrel, and a rear split body covering a portion inclusive of said substrate;
said rear split body has a substrate-covering plate part covering said substrate, and a lock part locked to said front split body and operative to inhibit said substrate-covering plate part from moving away from said substrate;
said cushion material is disposed in a compressed state between said substrate and said substrate-covering plate part by the locking of said lock part to said front split body; and
said substrate-covering plate part is attached to an inside wall of said casing, whereby said camera module is disposed in the inside of said casing.

12. The electronic apparatus as set forth in claim 11, wherein said substrate-covering plate part is attached to said inside wall of said casing in the condition where a rubber vibration isolator is interposed between said substrate-covering plate part and said inside wall of said casing.

13. An electronic apparatus comprising a casing, and a camera module incorporated in said casing;
wherein said camera module includes a camera body and a shield case;
said camera body includes a lens-barrel holding a shooting optical system, a substrate attached to said lens-barrel, an image pickup device incorporated in said lens-barrel and operative to pick up an image of an object focused by said shooting optical system and to output an image pickup signal, and a signal processing unit provided on said substrate and operative to receive said image pickup signal outputted from said image pickup device and to perform a predetermined signal processing;
said shield case is configured to cover said lens-barrel and said substrate and to provide electromagnetic shielding for said image pickup device and said signal processing unit;
said shield case has a substrate-covering plate part covering said substrate, and a lock part locked to said camera body and operative to inhibit said substrate-covering plate part from moving away from said substrate;
an insulating and elastic cushion material is disposed between said substrate and said substrate-covering plate part;
said cushion material is disposed in a compressed state between said substrate and said substrate-covering plate part by the locking of said lock part to said camera body; and
said substrate-covering plate part is attached to an inside wall of said casing, whereby said camera module is disposed in the inside of said casing;
wherein said substrate is provided with a ground land set at a reference potential; said substrate-covering plate part is rectangular in shape; said shield case has two opposed pairs of side surface portions which rise from four sides of said substrate-covering plate part and extend along side portions of said lens-barrel; said side surface portion is provided with an arm part which projects from said side surface portion, extends in a direction intersecting with the direction of spacing away and approaching said substrate-covering plate part relative to said substrate, and is elastically deformable in the direction of spacing away and approaching said substrate-covering plate part relative to said substrate; a grounding contact piece capable of making contact with said ground land is provided at the tip end of said arm part; and said grounding contact piece is put into contact with said ground land and the contact condition is maintained, by the elasticity of said arm part.

* * * * *